United States Patent
Rudisill et al.

(10) Patent No.: US 11,421,123 B2
(45) Date of Patent: *Aug. 23, 2022

(54) DISPERSION AND JETTABLE COMPOSITION CONTAINING CESIUM TUNGSTEN OXIDE NANOPARTICLES AND A ZWITTERIONIC STABILIZER

(71) Applicant: HEWLETT-PACKARD DEVELOPMENT COMPANY, L.P., Spring, TX (US)

(72) Inventors: Stephen Rudisill, San Diego, CA (US); Vladek Kasperchik, Corvallis, OR (US); Alexey S Kabalnov, San Diego, CA (US); Shannon Reuben Woodruff, San Diego, CA (US); Thomas M Sabo, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 521 days.

This patent is subject to a terminal disclaimer.

(21) Appl. No.: 16/325,454

(22) PCT Filed: Oct. 25, 2016

(86) PCT No.: PCT/US2016/058686
§ 371 (c)(1),
(2) Date: Feb. 14, 2019

(87) PCT Pub. No.: WO2018/080457
PCT Pub. Date: May 3, 2018

(65) Prior Publication Data
US 2021/0292584 A1   Sep. 23, 2021

(51) Int. Cl.
| | |
|---|---|
| C09D 11/38 | (2014.01) |
| C09D 11/033 | (2014.01) |
| C09D 11/037 | (2014.01) |
| C09D 11/322 | (2014.01) |
| C09C 3/08 | (2006.01) |
| C09C 1/00 | (2006.01) |
| B82Y 30/00 | (2011.01) |

(52) U.S. Cl.
CPC ............. *C09D 11/38* (2013.01); *B82Y 30/00* (2013.01); *C09C 1/00* (2013.01); *C09C 3/08* (2013.01); *C09D 11/033* (2013.01); *C09D 11/037* (2013.01); *C09D 11/322* (2013.01)

(58) Field of Classification Search
None
See application file for complete search history.

(56) References Cited

U.S. PATENT DOCUMENTS

| | | | |
|---|---|---|---|
| 5,204,055 A | 4/1993 | Sachs et al. | |
| 5,973,026 A | 10/1999 | Burns | |
| 6,259,962 B1 | 7/2001 | Gothait | |
| 7,007,872 B2 | 3/2006 | Yadav et al. | |
| 7,708,974 B2 | 5/2010 | Yadav | |
| 7,972,426 B2 | 7/2011 | Hinch et al. | |
| 8,430,475 B2 | 4/2013 | Kabalnov et al. | |
| 8,651,190 B2 | 2/2014 | Dietz | |
| 8,651,390 B2 | 2/2014 | Hinch et al. | |
| 9,234,110 B2 | 1/2016 | Katoh et al. | |
| 9,643,359 B2 | 5/2017 | Baumann et al. | |
| 10,682,810 B2 | 6/2020 | Rudisill et al. | |
| 10,759,112 B2 | 9/2020 | Rudisill et al. | |
| 2005/0074589 A1 | 4/2005 | Pan et al. | |
| 2005/0126434 A1* | 6/2005 | Feldkamp | C09D 11/38 106/31.43 |
| 2005/0271566 A1* | 12/2005 | Yadav | C01G 41/00 423/1 |
| 2006/0083694 A1 | 4/2006 | Kodas et al. | |
| 2006/0251996 A1 | 11/2006 | Bogerd et al. | |
| 2007/0238056 A1 | 10/2007 | Baumann et al. | |
| 2007/0241482 A1 | 10/2007 | Giller et al. | |
| 2008/0087188 A1 | 4/2008 | Kabalnov | |
| 2008/0187677 A1 | 8/2008 | Kabalnov | |
| 2008/0259147 A1 | 10/2008 | Oriakhi et al. | |
| 2009/0031922 A1 | 2/2009 | Rengaswamy et al. | |
| 2009/0214766 A1 | 8/2009 | Magdassi et al. | |
| 2010/0102700 A1 | 4/2010 | Jaiswal et al. | |
| 2010/0140852 A1 | 6/2010 | Kritchman et al. | |

(Continued)

FOREIGN PATENT DOCUMENTS

| | | |
|---|---|---|
| CA | 2927249 A1 | 4/2015 |
| CN | 1857917 | 11/2006 |

(Continued)

OTHER PUBLICATIONS

Faraday, Michael. "X. The Bakerian Lecture.—Experimental relations of gold (and other metals) to light." Philosophical Transactions of the Royal Society of London 147 (1857): 145-181.

Garcia, Guillermo, et el. "Dynamically modulating the surface plasmon resonance of doped semiconductor nanocrystals." Nano letters 11.10 (2011): 4415-4420.

Gross, Bethany C., et al. "Evaluation of 3D printing and its potential impact on biotechnology and the chemical sciences," (2014): 3240-3253.

Kanehara, Masayuki, et al. "Indium tin oxide nanoparticles with compositionally tunable surface plasmon . . . " Jrnl of the Amer Chem Society 131.49, 200,: 17736-17737.

Milligan, W. O., and R. H. Morriss. "Morphology of Colloidal Gold—A Comparative Study." Journal of the American Chemical Society 86.17 (1964): 3461-3467.

(Continued)

*Primary Examiner* — Katie L. Hammer
(74) *Attorney, Agent, or Firm* — HPI Patent Department

(57) ABSTRACT

An example of a dispersion includes cesium tungsten oxide nanoparticles, a zwitterionic stabilizer, and a balance of water. An example of a jettable composition includes cesium tungsten oxide nanoparticles, a zwitterionic stabilizer, a surfactant, a co-solvent, and a balance of water. A method for improving the stabilization of a jettable composition includes incorporating a zwitterionic stabilizer in the jettable composition, which includes the cesium tungsten oxide nanoparticles, the surfactant, the co-solvent, and the balance of water.

14 Claims, 3 Drawing Sheets

(56) References Cited

U.S. PATENT DOCUMENTS

| | | |
|---|---|---|
| 2012/0145037 A1 | 6/2012 | Deluca et al. |
| 2012/0225264 A1 | 9/2012 | Villwock |
| 2013/0072615 A1 | 3/2013 | Muro et al. |
| 2014/0352573 A1 | 12/2014 | Kasperchik et al. |
| 2015/0298394 A1 | 10/2015 | Sheinman |
| 2015/0307666 A1 | 10/2015 | Kodas et al. |
| 2015/0329679 A1 | 11/2015 | Yoshida et al. |
| 2016/0011348 A1 | 1/2016 | Hirakoso et al. |
| 2016/0081526 A1 | 3/2016 | Gottinger et al. |
| 2016/0082697 A1 | 3/2016 | Hara et al. |
| 2016/0168407 A1 | 6/2016 | Jarvis |
| 2016/0178804 A1 | 6/2016 | Shen et al. |
| 2016/0263829 A1 | 9/2016 | Okamoto |
| 2016/0332384 A1 | 11/2016 | De et al. |
| 2018/0272602 A1 | 9/2018 | Rudisill et al. |
| 2019/0054689 A1 | 2/2019 | Rudisill et al. |
| 2019/0240898 A1 | 8/2019 | Chaffins et al. |
| 2020/0376753 A1 | 12/2020 | Kabalnov et al. |
| 2021/0040686 A1 | 2/2021 | Lebron et al. |
| 2021/0047777 A1 | 2/2021 | Lebron et al. |

FOREIGN PATENT DOCUMENTS

| | | |
|---|---|---|
| CN | 100488768 C | 5/2009 |
| CN | 101663366 | 3/2010 |
| CN | 101765644 | 6/2010 |
| CN | 101959949 A | 1/2011 |
| CN | 104136555 | 11/2014 |
| CN | 104347728 A | 2/2015 |
| CN | 104487397 A | 4/2015 |
| CN | 105326489 | 2/2016 |
| CN | 105934485 A | 9/2016 |
| DE | 112014006177 T5 | 9/2016 |
| EP | 1724110 A1 | 11/2006 |
| EP | 2997869 A1 | 3/2016 |
| EP | 2998769 A1 | 3/2016 |
| JP | 2007502713 | 2/2007 |
| JP | 2011503274 | 1/2011 |
| JP | 2014114202 | 6/2014 |
| JP | 2014527481 | 10/2014 |
| JP | 2015214682 | 12/2015 |
| JP | 2015214682 A | 12/2015 |
| KR | 20060115560 | 11/2006 |
| KR | 2008-0007310 | 1/2008 |
| KR | 1020160011197 | 1/2016 |
| WO | WO-2005047007 A2 | 5/2005 |
| WO | WO-2015186663 | 12/2015 |
| WO | 2018/080438 A1 | 5/2018 |
| WO | 2018/080456 A1 | 5/2018 |
| WO | 2018/080457 A1 | 5/2018 |
| WO | 2018/174890 A1 | 9/2018 |

OTHER PUBLICATIONS

Usui, Hiroyuki, Takeshi Sasaki, and Naoto Koshizaki. "Optical transmittance of indium tin oxide nanoparticles prepared by laser-induced fragmentation in water." The Journal of Physical Chemistry B 110.26 (2006): 12800-12895.

Van der Zande, Bianca MI, et al. "Aqueous gold sols of rod-shaped particles." The Journal of Physical Chemistry B 101.6 (1997): 852-854.

Weiser, H., et al., "Von Weimark's Precipitation Theory and the Formation of Colloidal Gold", 10 pages, The Rice Institute, Houston, TX.

Chen, Dong-Chu et al., Preparation of Nano-WO_3 by Thermal Decomposition and Study of its Grain Characteristics and Dispersion Behavior, 2007. <http://en.cnki.com.cn/Article_en/CJFDTOTAL-JXHG200711004.htm>.

International Search Report and Written Opinion for International Publication No. PCT/US2016/058684 dated Aug. 24, 2017, 9 pages.

Takeda et al., "Near Infrared Absorption of Tungsten Oxide Nanoparticle Dispersions", J. Am. Ceram. Soc., 90 [12] p. 4059-4061 (2007) (Year: 2007).

* cited by examiner

DISPERSION AND JETTABLE COMPOSITION CONTAINING CESIUM TUNGSTEN OXIDE NANOPARTICLES AND A ZWITTERIONIC STABILIZER

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

BRIEF DESCRIPTION OF THE DRAWINGS

Features of examples of the present disclosure will become apparent by reference to the following detailed description and drawings, in which like reference numerals correspond to similar, though perhaps not identical, components.

DETAILED DESCRIPTION

Figure 1:
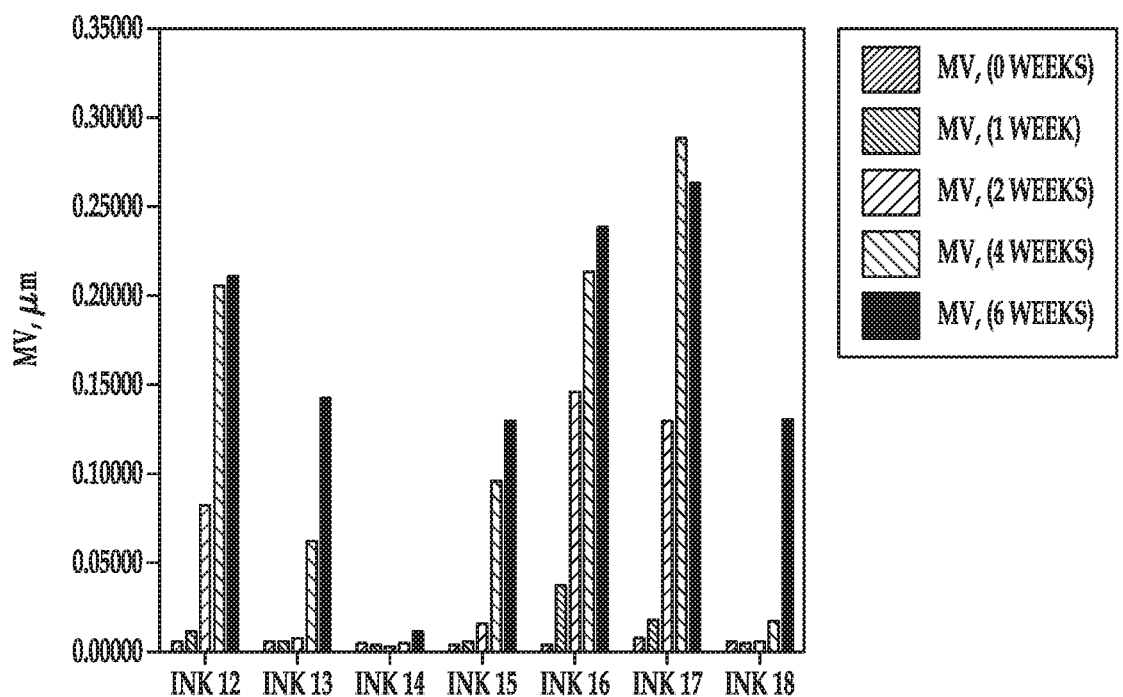
FIG. 1 is a bar graph depicting the volume-weighted mean diameter (MV, or mean diameter, in μm, of the volume distribution, Y axis) of examples of the jettable composition disclosed herein.

Disclosed herein is a water-based dispersion, which includes cesium tungsten oxide nanoparticles and a zwitterionic stabilizer. The zwitterionic stabilizer may enhance the stability of the cesium tungsten oxide nanoparticle dispersion during shipment and storage. Enhanced stability of the dispersion may be observed by minimal or no changes in pH, particle size (e.g., volume-weighted mean diameter), viscosity, and/or infrared (IR) absorbance over time.

Also disclosed herein is a jettable composition, which includes cesium tungsten oxide nanoparticles and the zwitterionic stabilizer. In some examples, the cesium tungsten oxide nanoparticles and zwitterionic stabilizer may be present in the previously mentioned water-based dispersion, which is incorporated (as a pigment dispersion and/or an absorbing agent dispersion) into a water-based vehicle to form the jettable composition. In other examples, the zwitterionic stabilizer and the cesium tungsten oxide nanoparticles may be added directly to the water-based vehicle to form the jettable composition. The zwitterionic stabilizer enhances the stability of the cesium tungsten oxide nanoparticles in the jettable composition. Enhanced stability in the jettable composition may be observed by minimal or no changes in pH, particle size (e.g., volume-weighted mean diameter), viscosity, and/or infrared (IR) absorbance over time.

As such, stabilization of the cesium tungsten oxide nanoparticle dispersion and/or the jettable composition can be measured in terms of pH stability, physical stability, viscosity stability, and/or IR absorbance stability. The term "pH stability," as referred to herein, means the ability of the dispersion or jettable composition to maintain a substantially unchanged pH over time (e.g., within ±0.5 of the original pH).

The term "physical stability," as referred to herein, means the ability of the cesium tungsten oxide nanoparticles in the dispersion or jettable composition to remain substantially unchanged over time. To determine the physical stability of a composition, the change in particle size may be measured over time (e.g., using dynamic light scattering), and the percentage of size change may be determined. The particle size may be considered to be "substantially unchanged over time" when the particle size does not increase above 20 nm (from its original size). However, in some instances, larger particle size increases may still be considered physically stable, as long as the particles do not settle. One method for determining the physical stability is to measure the particle size, in terms of volume-weighted distribution, of the cesium tungsten oxide nanoparticles. Such a distribution represents the population of particles, seen by their volume. As an example, the volume-weighted mean diameter may be measured with a NANOTRAC® particle sizing system (which may use a 50% cumulative value of a volume-weighted mean diameter), commercially available from Microtrac, Inc. The particle sizing system uses dynamic scattering of laser light.

In the examples disclosed herein, the volume-weighted mean diameter measurement is the mean diameter of the cesium tungsten oxide nanoparticles within a specific volume. The volume-weighted mean diameter is sometimes called the de Brouckere mean diameter, and is the weighted average volume diameter, assuming spherical particles of the same volume as the actual particles.

If after storage, the volume-weighted mean diameter remains relatively constant, this is an indication of a stable dispersion or jettable composition. However, if the volume-weighted mean diameter increases significantly after the dispersion or jettable composition has been in storage, this may be a sign of undesirable agglomeration and an indication of a less stable dispersion or jettable composition.

The term "viscosity stability," as referred to herein, means the ability of the dispersion or jettable composition to maintain a substantially unchanged viscosity over time (e.g., does not rise above 5 cP at room temperature, e.g., a temperature ranging from 18° C. to 22° C.).

The term "IR absorbance stability," as referred to herein means the ability of the dispersion or jettable composition to maintain a substantially unchanged IR absorbance over time (e.g., no more than a 10% loss in absorbance).

To facilitate the measurement of the pH change, the particle size change, the viscosity change, and/or the IR absorbance change, the dispersion or jettable composition may be stored in an accelerated storage (AS) environment. The pH, particle size, viscosity, and/or IR absorbance may be measured before and after the dispersion or jettable composition has been stored in the AS environment. The accelerated storage environment may be an environment that has a temperature ranging from about 45° C. to about 60° C. In an example, the accelerated storage environment is an oven baked at a temperature of about 60° C. and the dispersion or jettable composition is stored in the AS environment for about six weeks.

An additional way to facilitate the measurement of the pH change, the particle size change, the viscosity change, and/or the IR absorbance change is to subject the dispersion or jettable composition to a Temperature-cycle (T-cycle). A T-cycle test may indicate an instability in the dispersion or jettable composition that is not indicated by an AS environment test. Conversely, an AS environment test may indicate an instability in the dispersion or jettable composition that is not indicated by a T-cycle test. A stable dispersion or jettable composition should be able pass both an AS environment test and a T-cycle test. When conducting a T-cycle test, the pH, particle size, viscosity, and/or IR absorbance may be measured before and after the dispersion or jettable composition has undergone the T-cycle. The T-cycle may involve heating the dispersion or jettable composition to a high temperature and maintaining the dispersion or jettable composition at the high temperature for a few minutes, and then cooling the dispersion or jettable composition to a low temperature and maintaining the dispersion or jettable composition at the low temperature for a few minutes. The process may be repeated for a number of cycles (e.g., 5).

As mentioned above, a large pH change, a large particle size change, a large viscosity change, and/or a large IR absorbance change may indicate poor dispersion or jettable composition stabilization. Moreover, a large pH change (e.g., a pH change of greater than ±0.5), a large particle size change (e.g., a particle size increase to above 20 nm), or a large viscosity change (e.g., a viscosity increase to above 5 cP) can lead to a short shelf life of the dispersion or jettable composition. As one example, a large particle size change may result from phase separation in the bulk jettable composition (e.g., nanoparticles separating from the vehicle, agglomerating with one another, and/or settling), which would cause the jettable composition to be unusable. A large pH change, a large particle size, or a large viscosity change may also alter the jettability and/or the image quality. As previously mentioned, nanoparticle agglomeration and/or settling may render the jettable composition more difficult to jet. As another example, a large pH change can cause a large change in dispersion or jettable composition viscosity. If the pH decreases too much, the viscosity of the dispersion or jettable composition may increase, which renders the dispersion or jettable composition susceptible to faster hardening, which can clog printhead nozzles. If the pH increases too much, the viscosity of the dispersion or jettable composition may decrease, which causes the dispersion or jettable composition to be weak, to dry slowly, to exhibit poor water resistance, etc. Still further, a large IR absorbance change (e.g., an IR absorbance change of greater than 10% loss in absorbance) may render the dispersion or jettable composition unusable as an IR absorbing agent. As one example, a jettable composition containing a cesium tungsten oxide nanoparticle dispersion may be used as a fusing agent in a three-dimensional (3D) printing system, where the cesium tungsten oxide nanoparticles act as a plasmonic resonance absorber.

As mentioned above, the cesium tungsten oxide nanoparticle dispersion includes cesium tungsten oxide nanoparticles, the zwitterionic stabilizer, and a balance of water. In some examples, the cesium tungsten oxide nanoparticle dispersion consists of these components, with no other components.

In an example, the cesium tungsten oxide nanoparticles have a general formula of $Cs_xWO_3$, where $0<x<1$. The cesium tungsten oxide nanoparticles may give the dispersion a light blue color. The strength of the color may depend, at least in part, on the amount of the cesium tungsten oxide nanoparticles in the dispersion. In an example, the cesium tungsten oxide nanoparticles may be present in the dispersion in an amount ranging from about 1 wt % to about 20 wt % (based on the total wt % of the dispersion).

The average particle size (e.g., volume-weighted mean diameter) of the cesium tungsten oxide nanoparticles may range from about 1 nm to about 40 nm. In some examples, the average particle size of the cesium tungsten oxide nanoparticles may range from about 1 nm to about 15 nm or from about 1 nm to about 10 nm. The upper end of the particle size range (e.g., from about 30 nm to about 40 nm) may be less desirable, as these particles may be more difficult to stabilize.

The cesium tungsten oxide nanoparticle dispersion also includes the zwitterionic stabilizer. As mentioned above, the zwitterionic stabilizer may improve the stabilization of the dispersion. While the zwitterionic stabilizer has an overall neutral charge, at least one area of the molecule has a positive charge (e.g., amino groups) and at least one other area of the molecule has a negative charge. The cesium tungsten oxide nanoparticles may have a slight negative charge. The zwitterionic stabilizer molecules may orient around the slightly negative cesium tungsten oxide nanoparticles with the positive area of the zwitterionic stabilizer molecules closest to the cesium tungsten oxide nanoparticles and the negative area of the zwitterionic stabilizer molecules furthest away from the cesium tungsten oxide nanoparticles. Then, the negative charge of the negative area of the zwitterionic stabilizer molecules may repel cesium tungsten oxide nanoparticles from each other. The zwitterionic stabilizer molecules may form a protective layer around the cesium tungsten oxide nanoparticles, and prevent them from coming into direct contact with each other and/or increase the distance between the particle surfaces (e.g., by a distance ranging from about 1 nm to about 2 nm). Thus, the zwitterionic stabilizer may prevent the cesium tungsten oxide nanoparticles from agglomerating and/or settling in the dispersion.

Examples of suitable zwitterionic stabilizers include C2 to C8 betaines, C2 to C8 aminocarboxylic acids having a solubility of at least 10 g in 100 g of water, taurine, and combinations thereof. Examples of the C2 to C8 aminocarboxylic acids include beta-alanine, gamma-aminobutyric acid, glycine, and combinations thereof.

The zwitterionic stabilizer may be present in the dispersion in an amount ranging from about 2 wt % to about 35 wt % (based on the total wt % of the dispersion). When the zwitterionic stabilizer is the C2 to C8 betaine, the C2 to C8 betaine may be present in an amount ranging from about 8 wt % to about 35 wt % of a total wt % of dispersion. When the zwitterionic stabilizer is the C2 to C8 aminocarboxylic acid, the C2 to C8 aminocarboxylic acid may be present in an amount ranging from about 2 wt % to about 20 wt % of a total wt % of dispersion. When the zwitterionic stabilizer is taurine, taurine may be present in an amount ranging from about 2 wt % to about 35 wt % of a total wt % of dispersion.

In an example, the weight ratio of the cesium tungsten oxide nanoparticles to the zwitterionic stabilizer ranges from 1:10 to 10:1. In another example, the weight ratio of the cesium tungsten oxide nanoparticles to the zwitterionic stabilizer is 1:1.

The balance of the dispersion is water.

The zwitterionic stabilizer may be added to the cesium tungsten oxide nanoparticles and water before, during, or after milling of the nanoparticles in the water to form the dispersion.

As mentioned above, also disclosed herein is the jettable composition. The jettable composition can be applied using any known inkjet printing technique, such as, for example, continuous inkjet printing or drop-on-demand inkjet printing including, piezoelectric and thermal inkjet printing. The jettable composition may, in some instances, be used as an inkjet ink. For example, the cesium tungsten oxide nanoparticles may give the jettable composition a blue color (the strength of which may vary depending on the amount of the nanoparticles present), and thus may be used as an inkjet ink. For another example, the jettable composition may include an additional colorant (in addition to the cesium tungsten oxide nanoparticles), and thus may be used as an inkjet ink. The jettable composition may, in other instances, be used as a fusing agent in 3D printing.

The jettable composition disclosed herein, which includes the cesium tungsten oxide nanoparticles and the zwitterionic stabilizer, is a liquid, and may be included in a single cartridge set or a multiple-cartridge set. In the multiple-cartridge set, any number of the multiple jettable compositions may have the cesium tungsten oxide nanoparticles and the zwitterionic stabilizer incorporated therein.

In an example, the jettable composition disclosed herein includes the cesium tungsten oxide nanoparticles, the zwitterionic stabilizer, a surfactant, and a balance of water. In some examples, the jettable composition consists of these components, with no other components. In another example, the jettable composition disclosed herein includes the cesium tungsten oxide nanoparticles, the zwitterionic stabilizer, a co-solvent, a surfactant, and a balance of water. In some examples, the jettable composition consists of these components, with no other components. In other examples, the jettable composition may include additional components, such as an additive (e.g., an anti-kogation agent, a chelating agent, an antimicrobial agent, or combinations thereof).

As used herein, the terms "jettable composition vehicle," "liquid vehicle," and "vehicle" may refer to the liquid fluid in which the cesium tungsten oxide nanoparticles and the zwitterionic stabilizer are placed to form the jettable composition(s). A wide variety of liquid vehicles may be used with the jettable composition set(s) of the present disclosure. The vehicle may include water alone or in combination with a variety of additional components. Examples of these additional components may include co-solvent(s), surfactant(s), antimicrobial agent(s), anti-kogation agent(s), and/or a chelating agent.

The liquid vehicle of the jettable composition may also include surfactant(s). The surfactant may be present in an amount ranging from about 0.1 wt % to about 4 wt % (based on the total wt % of the jettable composition). Examples of suitable surfactants are non-ionic surfactants. Some specific examples include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.), or water-soluble, non-ionic surfactants (e.g., TERGITOL™ TMN-6, TERGITOL™ 1557, and TERGITOL™ 1559 from The Dow Chemical Company). In some examples, an anionic surfactant may be used in combination with the non-ionic surfactant. One suitable anionic surfactant is an alkyldiphenyloxide disulfonate (e.g., DOWFAX™ 8390 and DOWFAX™ 2A1 from The Dow Chemical Company). In some examples, it may be desirable to utilize a surfactant having a hydrophilic-lipophilic balance (HLB) less than 10.

The vehicle may include co-solvent(s). Some examples of the co-solvent that may be added to the vehicle include 1-(2-hydroxyethyl)-2-pyrrolidinone, 2-pyrrolidinone, 2-methyl-1,3-propanediol, 1,5-pentanediol, triethylene glycol, tetraethylene glycol, 1,6-hexanediol, tripropylene glycol methyl ether, ethoxylated glycerol-1 (LEG-1), and combinations thereof. Whether a single co-solvent is used or a combination of co-solvents is used, the total amount of co-solvent(s) in the jettable composition may range from about 2 wt % to about 80 wt % with respect to the total wt % of the jettable composition. The co-solvent loading may be adjusted to achieve a viscosity ranging from about 0.8 cP to 5 cP.

In some examples, the liquid vehicle may also include one or more of the previously mentioned additives. To reiterate, the additive may be an anti-kogation agent, a chelating agent, an antimicrobial agent, or a combination thereof. While the amount of the additive may vary depending upon the type of additive, generally the additive may be present in the jettable composition in an amount ranging from about 0.01 wt % to about 20 wt % (based on the total wt % of the jettable composition).

As mentioned above, an anti-kogation agent may be included in the jettable composition. Kogation refers to the deposit of dried jettable composition components on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer. Whether a single anti-kogation agent is used or a combination of anti-kogation agents is used, the total amount of anti-kogation agent(s) in the jettable composition may range from about 0.1 wt % to about 0.2 wt % (based on the total wt % of the jettable composition).

The liquid vehicle may also include a chelating agent. The chelating agent may be included in the jettable composition to eliminate the deleterious effects of heavy metal impurities. Examples of suitable chelating agents include disodium ethylenediaminetetraacetic acid (EDTA-Na), ethylene diamine tetra acetic acid (EDTA), and methylglycinediacetic acid (e.g., TRILON® M from BASF Corp.). Whether a single chelating agent is used or a combination of chelating agents is used, the total amount of chelating agent(s) in the jettable composition may range from 0 wt % to about 2 wt % based on the total wt % of the jettable composition.

The liquid vehicle may also include antimicrobial agent(s). Suitable antimicrobial agents include biocides and fungicides. Example antimicrobial agents may include the NUOSEPT® (Ashland Inc.), VANCIDE® (R.T. Vanderbilt Co.), ACTICIDE® B20 and ACTICIDE® M20 (Thor Chemicals), and combinations thereof. In an example, the jettable composition may include a total amount of antimicrobial agents that ranges from about 0.1 wt % to about 1 wt % (based on the total wt % of the jettable composition).

In some examples disclosed herein, the vehicle of the jettable composition may also include additional dispersant(s) (e.g., a low molecular weight (e.g., <5,000) polyacrylic acid polymer, such as CARBOSPERSE™ K-7028 Polyacrylate from Lubrizol), preservative(s), jettability additive(s), and the like.

The jettable composition includes the cesium tungsten oxide nanoparticles. In an example, the cesium tungsten oxide nanoparticles are added to the other components (including the zwitterionic stabilizer) to form the jettable composition. In another example, the cesium tungsten oxide nanoparticles are present in the previously described cesium tungsten oxide nanoparticle dispersion (including the zwitterionic stabilizer), which is a separate dispersion that is added to the other components to form the jettable composition.

As described herein, the cesium tungsten oxide nanoparticles have a general formula of $Cs_xWO_3$, where $0<x<1$. The cesium tungsten oxide nanoparticles may give the jettable composition a light blue color. The strength of the color may depend, at least in part, on the amount of the cesium tungsten oxide nanoparticles in the jettable composition. In an example, the cesium tungsten oxide nanoparticles may be present in the jettable composition in an amount ranging from about 1 wt % to about 15 wt % (based on the total wt % of the jettable composition). This weight percentage accounts for the weight percent of active cesium tungsten oxide nanoparticles in the jettable composition, and does not account for the total weight percent of the cesium tungsten oxide nanoparticle dispersion that may be incorporated in the jettable composition. As such, the weight percentages given do not account for any other components (e.g., water, zwitterionic stabilizer) that may be present when the cesium tungsten oxide nanoparticles are part of the dispersion.

The average particle size (e.g., volume-weighted mean diameter) of the cesium tungsten oxide nanoparticles in the jettable composition may range from about 1 nm to about 40 nm. In some examples, the average particle size of the cesium tungsten oxide nanoparticles may range from about 1 nm to about 15 nm or from about 1 nm to about 10 nm. The upper end of the particle size range (e.g., from about 30 nm to about 40 nm) may be less desirable, as these particles may be more difficult to stabilize.

The jettable composition also includes the zwitterionic stabilizer. As mentioned above, the zwitterionic stabilizer may improve the stabilization of the jettable composition including the cesium tungsten oxide nanoparticles. In the jettable composition, it is believed that the zwitterionic stabilizer molecules may form a protective layer around the cesium tungsten oxide nanoparticles (as discussed herein in reference to the dispersion), and prevent them from coming into direct contact with each other and/or increase the distance between the particle surfaces (e.g., by a distance ranging from about 1 nm to about 2 nm). Thus, the zwitterionic stabilizer may prevent the cesium tungsten oxide nanoparticles from agglomerating and/or settling in the jettable composition.

Examples of suitable zwitterionic stabilizers include any of those previously described for the dispersion, such as C2 to C8 betaines, C2 to C8 aminocarboxylic acids having a solubility of at least 10 g in 100 g of water, taurine, and combinations thereof.

The zwitterionic stabilizer may be present in the jettable composition in an amount ranging from about 2 wt % to about 35 wt % (based on the total wt % of the jettable composition). When the zwitterionic stabilizer is the C2 to C8 betaine, the C2 to C8 betaine may be present in an amount ranging from about 8 wt % to about 35 wt % of a total wt % of the jettable composition. When the zwitterionic stabilizer is the C2 to C8 aminocarboxylic acid, the C2 to C8 aminocarboxylic acid may be present in an amount ranging from about 2 wt % to about 20 wt % of a total wt % of the jettable composition. When the zwitterionic stabilizer is taurine, taurine may be present in an amount ranging from about 2 wt % to about 35 wt % of a total wt % of the jettable composition.

In an example, the weight ratio of the cesium tungsten oxide nanoparticles to the zwitterionic stabilizer ranges from 1:10 to 10:1. In another example, the weight ratio of the cesium tungsten oxide nanoparticles to the zwitterionic stabilizer is 1:1.

In some examples, the zwitterionic stabilizer may be added with the cesium tungsten oxide nanoparticles and the other components of the vehicle to form the jettable composition. In this example, the zwitterionic stabilizer may be added directly into the vehicle. In other examples, the zwitterionic stabilizer may be incorporated into the cesium tungsten oxide nanoparticle dispersion prior to incorporation of the dispersion into the vehicle.

The balance of the jettable composition is water.

In some examples, the jettable composition may also include a colorant in addition to the cesium tungsten oxide nanoparticles. The amount of the colorant that may be present in the jettable composition ranges from about 1 wt % to about 10 wt % (based on the total wt % of the jettable composition). The colorant may be a pigment and/or dye having any suitable color. Examples of the colors include cyan, magenta, yellow, etc. Examples of colorants include dyes, such as Acid Yellow 23 (AY 23), Acid Yellow 17 (AY 17), Acid Red 52 (AR 52), Acid Red 289 (AR 289), Reactive Red 180 (RR 180), H-MA magenta, H-MI magenta Direct Blue 199 (DB 199), Pro-Jet C854, H-CB cyan, or pigments, such as Pigment Blue 15:3 (PB 15:3), Pigment Red 122 (PR 122), Pigment Yellow 155 (PY 155), and Pigment Yellow 74 (PY 74). If an anionic colorant is included, the amount may be adjusted (e.g., lowered) so that the colorant does not crash out of the jettable composition.

A method is disclosed herein for improving the stabilization (e.g., pH stability, physical stability, viscosity stability, and/or IR absorbance stability) of a cesium tungsten oxide dispersion. The method includes incorporating the zwitterionic stabilizer in the dispersion.

The zwitterionic stabilizer of the method may be any example of the zwitterionic stabilizer as described herein. cesium tungsten oxide dispersion of the method may be the cesium tungsten oxide dispersion described herein, prior to the addition of the zwitterionic stabilizer.

In an example, the cesium tungsten oxide dispersion, into which the zwitterionic stabilizer is incorporated, includes the cesium tungsten oxide nanoparticles and a balance of water.

Also disclosed herein is a method for improving the stabilization (e.g., pH stability, physical stability, viscosity stability, and/or IR absorbance stability) of a jettable composition. The method includes incorporating the zwitterionic stabilizer in the jettable composition.

The zwitterionic stabilizer of the method may be any example of the zwitterionic stabilizer as described herein. The jettable composition of the method may be the jettable composition described herein, prior to the addition of the zwitterionic stabilizer alone or as part of the cesium tungsten oxide dispersion.

In an example, the jettable composition, into which the zwitterionic stabilizer is incorporated, includes the cesium tungsten oxide nanoparticles, the surfactant, the co-solvent, and a balance of water. In another example, the jettable composition, into which the zwitterionic stabilizer is incorporated, includes the cesium tungsten oxide nanoparticles, the surfactant, and a balance of water.

In still another example, this example of the method may include incorporating the zwitterionic stabilizer into an aqueous (water-based) dispersion containing the cesium tungsten oxide nanoparticles to form a stabilized dispersion. In this example, the method may also include combining the surfactant, in some instances the co-solvent, and the balance of water with the stabilized dispersion.

To further illustrate the present disclosure, examples are given herein. It is to be understood that these examples are provided for illustrative purposes and are not to be construed as limiting the scope of the present disclosure.

EXAMPLES

In Examples 1-6, several different jettable composition and dispersion formulations were prepared and analyzed. The particle size of the cesium tungsten oxide nanoparticles was measured in each of Examples 1-6 in terms of the volume-weighted mean diameter (MV). The volume-weighted mean diameter (MV) was measured with a NANOTRAC® WAVE™ particle size analyzer (available from MICROTRAC™—NIKKISO GROUP™). The test samples were prepared by diluting jettable composition samples [1:5000] with deionized water and analyzing the samples without further treatment. In Examples 4 and 5, the D50 (i.e., the median of the particle size distribution, where ½ the population is above this value and ½ is below this value) and the D95 (i.e., 95% the population is below this value) were also determined using the particle size analyzer. Also in Examples 4 and 5, the particle size was measured using an ACCUSIZER A 2000 (from PSS), which counts particles and determines the number of particles of a particular size that are present in 1 mL of the sample. In Example 7, the particle size measurements were made using a HORIBA™ LA-950 particle size analyzer.

Example 1

This example was performed to determine whether the stability of the dispersion was affected by jettable composition additives.

Cesium tungsten oxide was obtained in milled form as a dispersion in water, from Sumitomo Mining and Manufacturing Company (Sumitomo). The as-received cesium tungsten oxide dispersion did not contain any stabilizing additives, and volume-weighted mean diameter of the particles in the dispersion was determined to be 5 nm.

The cesium tungsten oxide dispersion was incorporated into 14 different formulations (F1-F14). Each formulation contained 8 wt % of the cesium tungsten oxide nanoparticles. The general components of each formulation, in addition to the 8 wt % of cesium tungsten oxide, are shown in Table 1.

Each formulation was stored in a closed vial in an accelerated storage (AS) environment at a temperature of 60° C. for 19 days. The particle size (volume-weighted mean diameter) and the formulation appearance were tracked with time. The particle size and formulation appearance results after the formulations were stored in the AS environment are shown in Table 1. A particle size was not recorded for the formulations that phase separated into two layers or the formulations that precipitated the cesium tungsten oxide.

TABLE 1

| ID | Formulation | | Appearance | Particle Size (MV, nm) |
|---|---|---|---|---|
| F1 | 2-pyrrolidinone | 20.00 wt % | Phase separated, 2 layers | — |
| | CRODAFOS ™ O3A | 0.50 wt % | | |
| | SURFYNOL ® SEF | 0.75 wt % | | |
| | CAPSTONE ® FS-35 | 0.05 wt % | | |
| | CARBOSPERSE ™ K-7028 | 0.01 wt % | | |
| | TRILON ® M | 0.04 wt % | | |
| | PROXEL ® GXL | 0.18 wt % | | |
| | KORDEK ™ MLX | 0.14 wt % | | |
| | Cesium tungsten oxide | 8 wt % | | |
| | Water | balance | | |
| F2 | 2-pyrrolidinone | 32.00 wt % | Loose gel | 126 |
| | 2-methyl-1,3-propanediol | 18.00 wt % | | |
| | TERGITOL ™ 15S7 | 1.90 wt % | | |
| | CAPSTONE ® FS-35 | 0.82 wt % | | |
| | Cesium tungsten oxide | 8 wt % | | |
| | Water | balance | | |
| F3 | Betaine (i.e., C2 betaine) | 10 wt % | Stable | 4.3 |
| | Cesium tungsten oxide | 8 wt % | | |
| | Water | balance | | |
| F4 | TRIS buffer | 1 wt % | Phase separated, 2 layers | — |
| | Cesium tungsten oxide | 8 wt % | | |
| | Water | balance | | |

TABLE 1-continued

| ID | Formulation | Appearance | Particle Size (MV, nm) |
|---|---|---|---|
| F5 | Styrene-maleic anhydride copolymer, produced by Cray Valley Company Cesium tungsten oxide Water | 5 wt % Phase separated immediately 8 wt % balance | — |
| F6 | FLOQUAT ™ 2350 polymer manufactured by SNF Cesium tungsten oxide Water | 4 wt % Immediate precipitate 8 wt % balance | — |
| F7 | Triethanolamine Cesium tungsten oxide Water | 3 wt % Phase separated, 8 wt % 2 layers balance | — |
| F8 | 2-(N-morpholino)ethane- sulfonic acid (buffer) Cesium tungsten oxide Water | 1 wt % Loose gel 8 wt % balance | 46 |
| F9 | KORDEK ™ Cesium tungsten oxide Water | 0.1 wt % Stable 8 wt % balance | 5 |
| F10 | PROXEL ® GXL Cesium tungsten oxide Water | 0.1 wt % Loose precipitate 8 wt % at the bottom balance | 12 |
| F11 | TRILON ® M Cesium tungsten oxide Water | 1 wt % Immediate 8 wt % precipitate balance | — |
| F12 | 1-(2-Hydroxyethyl)-2- pyrrolidone Cesium tungsten oxide Water | 50 wt % Loose gel 8 wt % balance | 35 |
| F13 | 2-pyrrolidinone TERGITOL ™ 15S30 Cesium tungsten oxide Water | 50 wt % Loose gel 0.1 wt % 8 wt % balance | 78 |
| F14 | 1-(2-Hydroxyethyl)2- pyrrolidone TERGITOL ™ 15S30 Cesium tungsten oxide Water | 50 wt % Loose gel 0.1 wt % 8 wt % balance | 43 |

As shown in Table 1, the cesium tungsten oxide dispersion was stable in formulation F3 containing betaine, an example of the zwitterionic stabilizer. The results in Table 1 also illustrate that the cesium tungsten oxide dispersion had relatively poor stability with the other solvents and additives tested. While formulation F9 containing KORDEK™ alone was stable, formulation F1 containing in KORDEK™ in combination with other jettable composition components (i.e., 2-pyrrolidinone, CRODAFOS™ O3A, SURFYNOL® SEF, CAPSTONE® FS-35, CARBOSPERSE™ K-7028, TRILON® M, and PROXEL® GXL) phase separated into two layers.

Example 2

Seven examples of the jettable composition (labeled Ink 2, Ink 3, Ink 4, Ink 5, Ink 6, Ink 8, and Ink 10) were prepared with betaine as the zwitterionic stabilizer. Four comparative jettable compositions (labeled Ink 1, Ink 7, Ink 9, and Ink 11) were also prepared. The comparative jettable compositions contained no stabilizer. The general formulations of the example and comparative jettable compositions are shown in Table 2, with the wt % of each component that was used.

TABLE 2

| Component | Ink 1 | Ink 2 | Ink 3 | Ink 4 | Ink 5 | Ink 6 | Ink 7 | Ink 8 | Ink 9 | Ink 10 | Ink 11 |
|---|---|---|---|---|---|---|---|---|---|---|---|
| 1-(2-Hydroxyethyl)-2-pyrrolidone | 50 | 45 | 40 | 30 | 20 | 0 | 20 | 0 | 10 | 10 | 0 |
| Betaine | 0 | 5 | 10 | 15 | 20 | 20 | 0 | 33 | 0 | 10 | 0 |
| Cesium tungsten oxide (from Sumitomo) | 8 | 8 | 8 | 8 | 8 | 8 | 8 | 8 | 8 | 8 | 8 |
| Water | 42 | 42 | 42 | 47 | 52 | 72 | 72 | 59 | 82 | 72 | 92 |

Each example and comparative jettable composition was stored in an AS environment at a temperature of 60° C. The particle size in terms of the volume-weighted mean diameter for each example and comparative jettable composition was measured immediately after preparation (week 0) and after 1, 2, and 4 weeks in the AS environment. The particle size differential was calculated for each example and comparative jettable composition using the particle sizes immediately after preparation and after 4 weeks in the AS environment. The particle size for each example and comparative jettable composition immediately after preparation and after 1, 2, and 4 weeks in the AS environment and the particle size differential are shown in Table 3. A particle size after 4 weeks in the AS environment was not recorded for the Ink 9 because the cesium tungsten oxide particles had settled.

TABLE 3

| Jettable Composition ID | Particle size immediately after preparation (MV, nm) | Particle size after 1 week AS (MV, nm) | Particle size after 2 weeks AS (MV, nm) | Particle size after 4 weeks AS (MV, nm) | Particle size differential (week 0/ week 4) |
| --- | --- | --- | --- | --- | --- |
| Ink 1 | 5.89 | 6.73 | 20.35 | 55.2 | 49.31 |
| Ink 2 | 5.14 | 5.36 | 5.97 | 22.45 | 17.31 |
| Ink 3 | 5.86 | 4.86 | 5.06 | 5.51 | -0.35 |
| Ink 4 | 4.68 | 4.31 | 4.76 | 4.63 | -0.05 |
| Ink 5 | 5.74 | 3.96 | 4.26 | 4.4 | -1.34 |
| Ink 6 | 4.9 | 3.74 | 4.27 | 4.1 | -0.8 |
| Ink 7 | 5.61 | 6.63 | 7.53 | 85.2 | 79.59 |
| Ink 8 | 5.56 | 3.4 | 3.65 | 3.73 | -1.83 |
| Ink 9 | 5.94 | 6.23 | 7.11 | N/A | N/A |
| Ink 10 | 6.24 | 4.49 | 4.88 | 6.5 | 0.26 |
| Ink 11 | 6.29 | 5.8 | 6.81 | 8.47 | 2.18 |

The results shown in Table 3 indicate that 1-(2-hydroxyethyl)-2-pyrrolidone alone destabilizes the cesium tungsten oxide dispersion and betaine stabilizes the cesium tungsten oxide dispersion (compare, e.g., Inks 1, 7 and 9 with Inks 6 and 8). The results in Table 3 illustrate that when a combination of 1-(2-hydroxyethyl)-2-pyrrolidone and betaine are used, better stabilization is obtained when the betaine is present in an amount of at least 10 wt %. Table 3 further shows that the example jettable compositions containing at least 10 wt % betaine (which corresponds to at least a 1:1 weight ratio of betaine to the cesium tungsten oxide) have a particle size change of 1% or less after 4 weeks.

Example 3

Another seven examples of the jettable composition (labeled Inks 12-18) were prepared with either beta-alanine or betaine as the zwitterionic stabilizer. Inks 15 and 16 were prepared by adding beta-alanine during the milling of the cesium tungsten oxide. Inks 12, 13, 14, and 18 were prepared by adding beta-alanine after milling the cesium tungsten oxide. Ink 17 was prepared by adding betaine after milling the cesium tungsten oxide. The general formulations of the example jettable compositions are shown in Table 4, with the wt % of each component that was used.

TABLE 4

| Component | Ink 12 | Ink 13 | Ink 14 | Ink 15 | Ink 16 | Ink 17 | Ink 18 |
| --- | --- | --- | --- | --- | --- | --- | --- |
| Cesium tungsten oxide (from Sumitomo) | 8 | 8 | 8 | 8 | 8 | 8 | 8 |
| 2-pyrrolidinone | 20 | 20 | 20 | 20 | 20 | 20 | 20 |
| CRODAFOS ™ O3A | 0.5 | 0.5 | 0.5 | 0.5 | 0.5 | 0.5 | 0.5 |
| SURFYNOL ® SEF | 0.75 | 0.75 | 0.75 | 0.75 | 0.75 | 0.75 | 0.75 |
| CARBOSPERSE ™ K-7028 | 0.01 | 0.01 | 0.01 | 0.01 | 0.01 | 0.01 | 0.01 |
| DOWFAX ™ 8390 | 0.1 | 0.1 | 0.1 | 0.1 | 0.1 | 0.1 | 0.1 |
| TRILON ® M | 0.04 | 0.04 | 0.04 | 0.04 | 0.04 | 0.04 | 0.04 |
| PROXEL ® GXL | 0.18 | 0.18 | 0.18 | 0.18 | 0.18 | 0.18 | 0.18 |

TABLE 4-continued

| Component | Ink 12 | Ink 13 | Ink 14 | Ink 15 | Ink 16 | Ink 17 | Ink 18 |
|---|---|---|---|---|---|---|---|
| KORDEK ™ MLX | 0.14 | 0.14 | 0.14 | 0.14 | 0.14 | 0.14 | 0.14 |
| Beta-Alanine | 3 | 5 | 8 | 4 | 2 | 0 | 5 |
| Betaine | 0 | 0 | 0 | 0 | 0 | 8 | 0 |
| Water | balance | balance | balance | balance | balance | balance | balance |

Each example jettable composition was stored in an AS environment at a temperature of 60° C. The volume-weighted mean diameter of the cesium tungsten oxide nanoparticles for each example jettable composition was measured after preparation and after 1, 2, 4, and 6 weeks in the AS environment.

The results of these measurements are shown in FIG. 1. The volume-weighted mean diameter values (MV, μm) are along the Y axis, and the X axis illustrates the jettable composition (the bars from the left to the right for each jettable composition represent the respective jettable composition after 0 weeks, 1 week, 2 weeks, 4 weeks, and 6 weeks of AS). FIG. 1 shows that beta-alanine can stabilize the cesium tungsten oxide at a lower wt % (and at a lower weight ratio) than betaine. FIG. 1 further shows that both beta-alanine and betaine are able to stabilize the cesium tungsten oxide growth in examples of the jettable composition in the presence of solvents and additives. Inks 16 and 17 were able to provide stabilizing action for about 1 week; Ink 12 was able to provide stabilizing action for about 2 weeks; Inks 13, 15, and 18 were able to provide stabilizing action for about 4 weeks; and Ink 14 was able to provide stabilizing action for about 6 weeks. It is noted that while CARBOSPERSE™ K-7028 was included in the formulations of Inks 12-18, it is believed that its presence did not affect the stabilization of the jettable compositions.

Example 4

Another two examples of the jettable composition (labeled Inks 19 and 20) were prepared with betaine as the zwitterionic stabilizer. The general formulations of the example jettable compositions are shown in Table 5, with the wt % of each component that was used.

TABLE 5

| Component | Ink 19 | Ink 20 |
|---|---|---|
| 1-(2-hydroxyethyl)-2-pyrrolidone | 25 | 25 |
| TERGITOL ™ 15S30 | 0.2 | 0.2 |
| Betaine | 10 | 1 |
| Cesium tungsten oxide (from Sumitomo) | 8 | 8 |
| Water | balance | balance |

Each example jettable composition was stored in an AS environment at a temperature of 60° C. The particle size for each example jettable composition was measured after preparation, after 1 week, and after 2 weeks in the AS environment. In this Example, several particle size measurements were made, including: volume-weighted mean diameter (MV, in μm), 50% (D50, 50% of the particles below this size) in μm, 95% (D95, 95% of the particles are below this size) in μm, total # of particles/mL≥0.5 μm, and total # of particles/mL≥1 μm. The particle size change was calculated for each example jettable composition using the particle sizes after preparation and after 2 weeks in the AS environment. The results of the particle size measurements for Ink 19 are shown in Table 6, and the results of the particle size measurements for Ink 20 are shown in Table 7.

TABLE 6

| Particle size | After preparation | After 1 week AS | After 2 weeks AS | Change after 2 weeks AS (%) |
|---|---|---|---|---|
| MV in μm | 0.0061 | 0.0048 | 0.0047 | 0.78 |
| 50% in μm | 0.0049 | 0.0040 | 0.0039 | 0.78 |
| 95% in μm | 0.0121 | 0.0098 | 0.0097 | 0.81 |
| Total # of particles/mL ≥ 0.5 μm | 14,600,000 | 12,300,000 | 12,700,000 | 0.87 |
| Total # of particles/mL ≥ 1 μm | 146,000 | 171,000 | 169,000 | 1.16 |

TABLE 7

| Particle size | After preparation | After 1 week AS | After 2 weeks AS | Change after 2 weeks AS (%) |
|---|---|---|---|---|
| MV in μm | 0.0065 | 0.0086 | 0.0093 | 1.43 |
| 50% in μm | 0.0052 | 0.0067 | 0.0071 | 1.36 |
| 95% in μm | 0.0013 | 0.0176 | 0.0195 | 14.50 |
| Total # of particles/mL ≥ 0.5 μm | 9,930,000 | 10,600,000 | 10,700,000 | 1.08 |

TABLE 7-continued

| Particle size | After preparation | After 1 week AS | After 2 weeks AS | Change after 2 weeks AS (%) |
|---|---|---|---|---|
| Total # of particles/ mL ≥ 1 μm | 208,000 | 287,000 | 373,000 | 1.80 |

Tables 6 and 7 show that Ink 19, which contained 10 wt % betaine (which corresponds to a 1.25:1 weight ratio of betaine to the cesium tungsten oxide), stabilized the cesium tungsten oxide better than Ink 20, which contained 1 wt % betaine (which corresponds to a 1:8 weight ratio of betaine to the cesium tungsten oxide).

Figure 2:
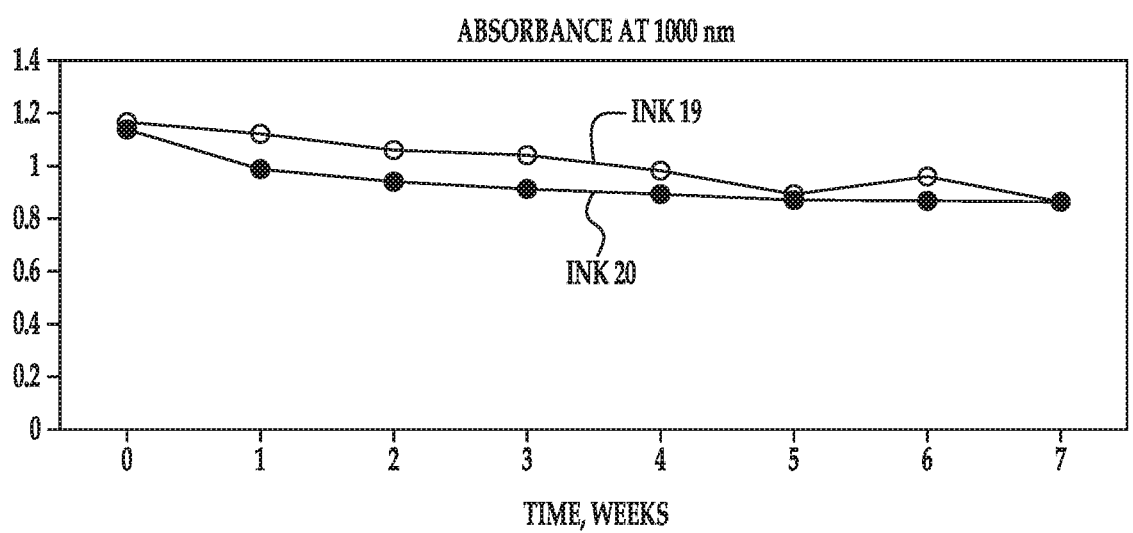
FIG. 2 is a graph illustrating the absorbance (Y axis, Absorbance units (AU) at 1:1000 dilution in water and a 1 cm light path) at a wavelength of 1,000 nm of example jettable compositions as a function of time (weeks, X axis) in an accelerated storage (AS) environment.

Inks 19 and 20 (at 1:500 dilution with water) were also tested for absorbance at a wavelength of 1,000 nm after preparation, and after 1, 2, 3, 4, 5, 6, and 7 weeks in the AS environment at 60° C. The results of the absorbance measurements are shown in FIG. 2. The absorbance values are along the Y axis, and the X axis indicates the amount of time (weeks) the jettable composition was stored in the AS environment. FIG. 2 shows that the higher concentration of betaine in Ink 19 slowed the decrease in absorbance (as compared to Ink 20).

Example 5

Three cesium tungsten oxide dispersions, containing 20 wt % of cesium tungsten oxide and no stabilizing additives, were obtained from Sumitomo. No changes were made to the first dispersion (labeled Dispersion 1). 20 wt % of water was added to the second dispersion (labeled Dispersion 2). 20 wt % of dry beta-alanine was added to the third dispersion (labeled Dispersion 3) under constant milling until the beta-alanine was fully dissolved. The general formulations of the final dispersions are shown below in Table 8, with the wt % of each component that was used.

TABLE 8

| Component | Dispersion 1 | Dispersion 2 | Dispersion 3 |
|---|---|---|---|
| Cesium tungsten oxide (from Sumitomo) | 20 | 16 | 16 |
| Beta-Alanine | 0 | 0 | 20 |
| Water | balance | balance | balance |

Each dispersion was put through a T-cycle. During the T-cycle, each dispersion was heated to and maintained at a high temperature of 70° C. for a few minutes, and then each dispersion was cooled to and maintained at a low temperature of −40° C. for a few minutes. This process was repeated for each dispersion for 5 cycles. For each dispersion, viscosity, pH, and particle size (MV in μm, 50% in μm, 95% in μm, total # of particles/mL≥0.5 μm, and total # of particles/mL≥1 μm) was measured before and after the T-cycle, and the change ratio (after/before) for each set of measurements was calculated. The results for Dispersion 1 are shown in Table 9, the results for Dispersion 2 are shown in Table 10, and the results for Dispersion 3 are shown in Table 11.

TABLE 9

| Measurement | Before T-cycle | After T-cycle | Ratio |
|---|---|---|---|
| Viscosity in cP | 1.5 | 0.8 | 0.5 |
| pH | 4.22 | 4.42 | n/a |

TABLE 9-continued

| Measurement | Before T-cycle | After T-cycle | Ratio |
|---|---|---|---|
| MV in μm | 0.00341 | 0.0475 | 13.9 |
| 50% in μm | 0.00280 | 0.02653 | 9.5 |
| 95% in μm | 0.00686 | 0.1573 | 22.9 |
| Total # of particles/ mL ≥ 0.5 μm | 13,700,000 | 341,000,000 | 25.0 |
| Total # of particles/ mL ≥ 1 μm | 59,700 | 11,800,000 | 198.3 |

TABLE 10

| Measurement | Before T-cycle | After T-cycle | Ratio |
|---|---|---|---|
| Viscosity in cP | 1.3 | 0.8 | 0.6 |
| pH | 4.36 | 4.42 | n/a |
| MV in μm | 0.00372 | 0.01833 | 4.9 |
| 50% in μm | 0.00337 | 0.01233 | 3.7 |
| 95% in μm | 0.00752 | 0.0510 | 6.8 |
| Total # of particles/ mL ≥ 0.5 μm | 11,600,000 | 548,000,000 | 47.3 |
| Total # of particles/ mL ≥ 1 μm | 54,000 | 27,400,000 | 506.9 |

TABLE 11

| Measurement | Before T-cycle | After T-cycle | Ratio |
|---|---|---|---|
| Viscosity in cP | 3.0 | 3.1 | 1.0 |
| pH | 6.64 | 6.64 | n/a |
| MV in μm | 0.00274 | 0.00212 | 0.8 |
| 50% in μm | 0.00224 | 0.00174 | 0.8 |
| 95% in μm | 0.00558 | 0.00424 | 0.8 |
| Total # of particles/ mL ≥ 0.5 μm | 15,900,000 | 22,800,000 | 1.4 |
| Total # of particles/ mL ≥ 1 μm | 5,150,000 | 4,570,000 | 0.9 |

Tables 9-11 show that Dispersion 3, which contained 20 wt % beta-alanine, had improved stabilization compared to Dispersions 1 and 2. The improved stabilization of Dispersion 3 was also seen in the appearances of the dispersions. Dispersion 3 stayed as one phase, while Dispersions 1 and 2 separated into two layers. It is noted that the viscosity measurements after T-cycle for Dispersions 1 and 2 were of the upper layer of the separated dispersions.

Example 6

Figure 3:
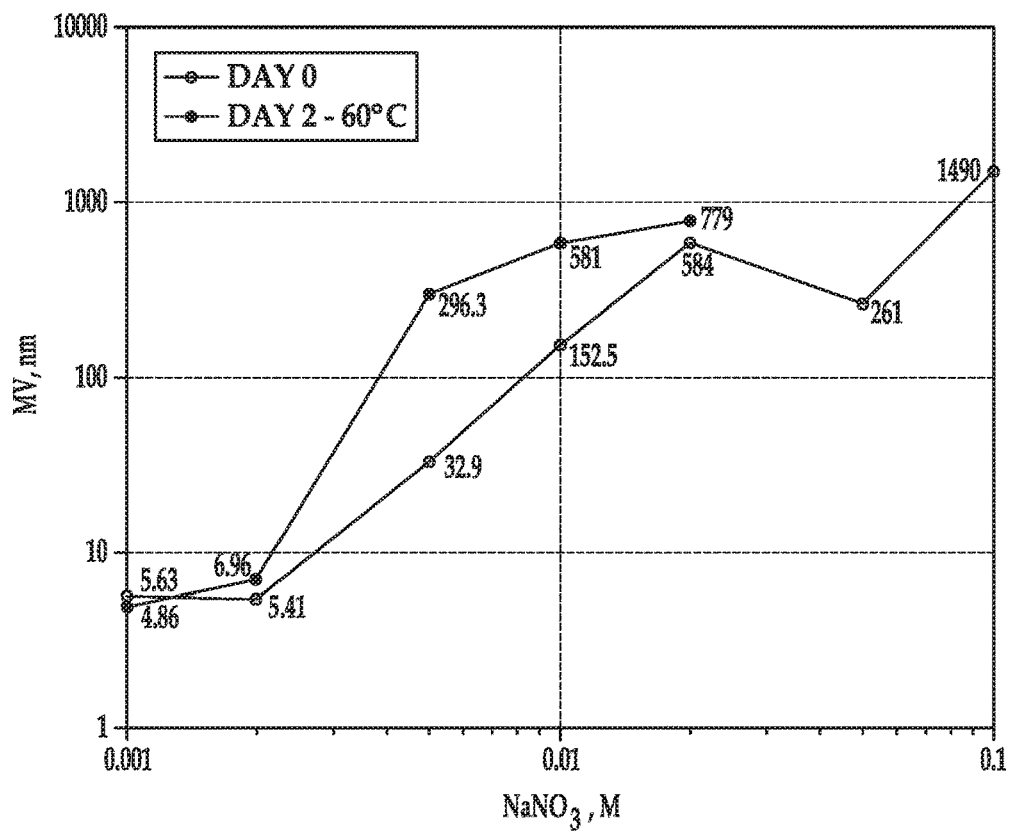
FIG. 3 is a graph illustrating the effect of $NaNO_3$ concentration (M, X axis) on the volume-weighted mean diameter (MV, in nm, Y axis) of cesium tungsten oxide in aqueous dispersions.

The impact of the addition of small amounts of salt (NaNO$_3$) on the volume-weighted mean diameter (MV, in nm) of cesium tungsten oxide in dispersions containing 8 wt % of cesium tungsten oxide (prior to the addition of the salt)

and no stabilizing additives was tested. The effect on the volume-weighted mean diameter was measure immediately after the addition of the salt and after 2 days in a 60° C. AS environment. The particle sizes of the cesium tungsten oxide in the dispersion were measured. The results of these measurements are shown in FIG. 3. The volume-weighted mean diameter values (MV, nm) are along the Y axis, and the X axis indicates the amount of $NaNO_3$ (M) added to the dispersions. FIG. 3 shows that the presence of >0.002M of the monovalent cation salt in the cesium tungsten oxide leads to almost instant increase of measured particle size. As such, FIG. 3 shows that a salt shock test is a very efficient way to test additive(s) for their capability of improving cesium tungsten oxide dispersion stability.

Three additional cesium tungsten oxide dispersions (labeled Dispersions 4-6) were prepared. The general formulations of the dispersions, prior to the addition of salt, are shown below in Table 12, with the wt % of each component that was used.

TABLE 12

| Component | Dispersion 4 | Dispersion 5 | Dispersion 6 |
|---|---|---|---|
| Cesium tungsten oxide (from Sumitomo) | 8 | 8 | 8 |
| Betaine | 0 | 4 | 8 |
| Water | balance | balance | balance |

Figure 4:
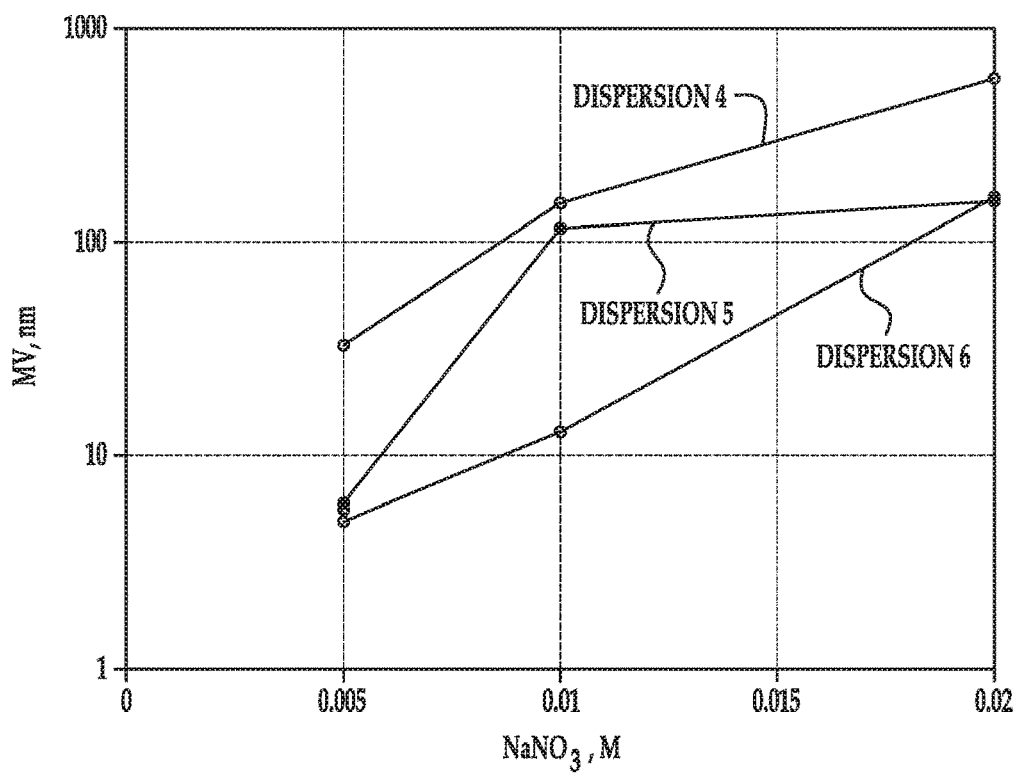
FIG. 4 is a graph illustrating the effect of $NaNO_3$ concentration (M, X axis) on the volume-weighted mean diameter (MV, in nm, Y axis) of cesium tungsten oxide in further aqueous dispersions.

Then a $NaNO_3$ stock solution was progressively added (to achieve concentrations of 0.005 M, 0.01 M, and 0.02 M) with subsequent sonication to the dispersions. Again, the particle sizes of the cesium tungsten oxide in the dispersions were measured. The results of these measurements are shown in FIG. 4. The volume-weighted mean diameter values (MV, nm) are along the Y axis, and the X axis indicates the amount of $NaNO_3$ (M) added to the dispersions. FIG. 4 shows that both Dispersion 5 (which corresponds to a 1:2 weight ratio of betaine to the cesium tungsten oxide) and Dispersion 6 (which corresponds to a 1:1 weight ratio of betaine to the cesium tungsten oxide) can tolerate $NaNO_3$ at and below a concentration of 0.005 M. FIG. 4 further shows that Dispersion 6 begins to show signs of destabilization when the $NaNO_3$ concentration is close to 0.01 M.

Three more cesium tungsten oxide dispersions (labeled Dispersion 7-9) were prepared. The general formulations of the dispersions, prior to the addition of salt, are shown below in Table 13, with the wt % of each component that was used.

TABLE 13

| Component | Dispersion 7 | Dispersion 8 | Dispersion 9 |
|---|---|---|---|
| Cesium tungsten oxide (from Sumitomo) | 8 | 8 | 8 |
| Betaine | 0 | 8 | 0 |
| Beta-Alanine | 0 | 0 | 8 |
| Water | balance | balance | balance |

Figure 5:
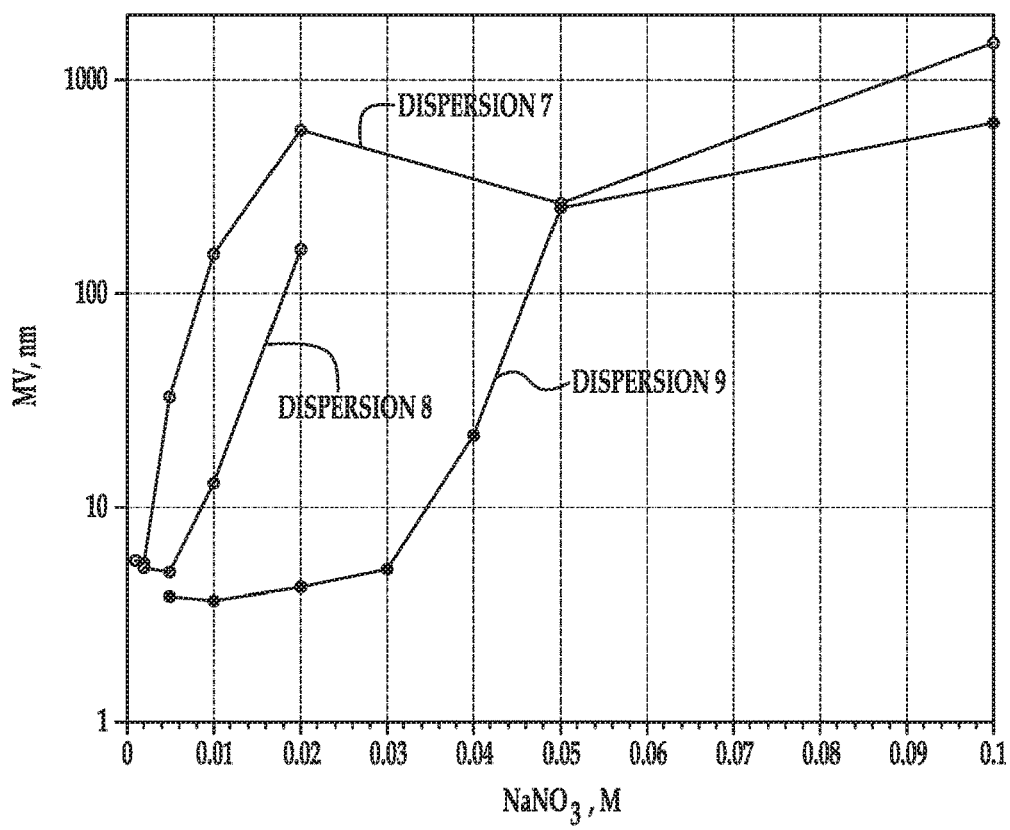
FIG. 5 is a graph illustrating the effect of $NaNO_3$ concentration (M, X axis) on the volume-weighted mean diameter (MV, in nm, Y axis) of cesium tungsten oxide in still further aqueous dispersions.

Then a $NaNO_3$ stock solution was progressively added with subsequent sonication to the dispersions. Again, the particle sizes of the cesium tungsten oxide in the dispersions were measured. The results of these measurements are shown in FIG. 5. The volume-weighted mean diameter values (MV, nm) are along the Y axis, and the X axis indicates the amount of $NaNO_3$ (M) added to the dispersions. FIG. 5 shows that Dispersion 9 (which corresponds to a 1:1 weight ratio of beta-alanine to the cesium tungsten oxide) can tolerate $NaNO_3$ at and below a concentration of 0.003 M.

Example 7

Pre-mill cesium tungsten oxide concentrate, containing 50 wt % of cesium tungsten oxide, was obtained from Sumitomo. The mean particle size (measured by using a HORIBA™ LA-950 particle size analyzer) was about 35 µm. Three additional cesium tungsten oxide dispersions (labeled Dispersion 10-12) were prepared. The general formulations of the dispersions are shown below in Table 14, with the wt % of each component that was used.

TABLE 14

| Component | Dispersion 10 | Dispersion 11 | Dispersion 12 |
|---|---|---|---|
| Cesium tungsten oxide (from Sumitomo) | 20 | 20 | 20 |
| Beta-Alanine | 0 | 25 | 50 |
| Water | balance | balance | balance |

Figure 6:
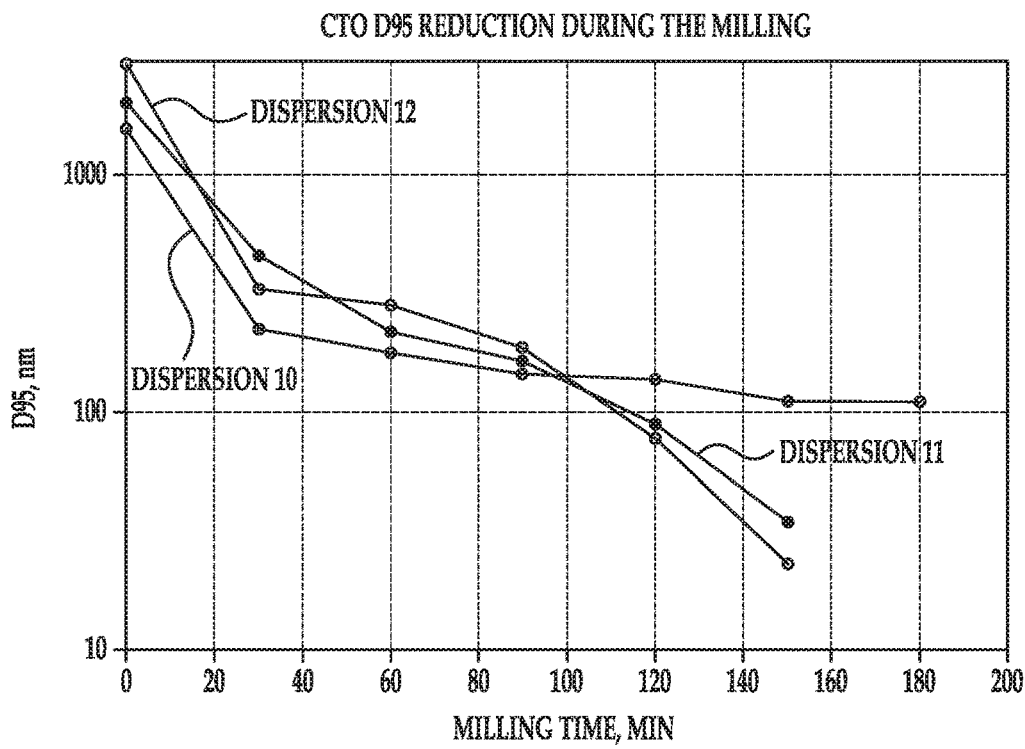
FIG. 6 is a graph illustrating the effect of milling time (minutes, X axis) on the D95 particle size (nm, Y axis) of cesium tungsten oxide in aqueous dispersions.

Then 500 g of each of the dispersions was milled using a MINICER™ bead mill (available from NETZSCH™) and 300 µm zirconia and YTZ® beads at a rotor speed of 1750 rpm. The duration of the milling was 150 minutes for Dispersion 10, and 180 minutes for Dispersions 11 and 12. The D95 particle size of cesium tungsten oxide was measured for each dispersion after milling for 0 minutes, 30 minutes, 60 minutes, 90 minutes, 120 minutes, and 150 minutes. The D95 particle size of cesium tungsten oxide was measured for Dispersion 10 was also measured after 180 minutes. The results of these measurements are shown in FIG. 6. The D95 particle size values (nm) are along the Y axis, and the X axis indicates the milling time (minutes). FIG. 6 shows that Dispersion 10 still had a D95 particle size of 111 nm after 180 minutes of milling, while Dispersion 11 had a D95 particle size of 17.5 nm after 150 minutes of milling, and Dispersion 12 had a D95 particle size of 18.9 nm after 150 minutes of milling. Additionally, the volume-weighted mean diameter of cesium tungsten oxide was measured for each dispersion after milling. The volume-weighted mean diameter of Dispersion 10 was about 25 nm after 180 minutes of milling. The volume-weighted mean diameter of Dispersion 11 was about 9.9 nm after 150 minutes of milling, and the volume-weighted mean diameter of Dispersion 12 was about 10.1 nm after 150 minutes of milling. Thus, the presence of beta-alanine significantly reduced both the volume-weighted mean diameter and the D95 particle size of cesium tungsten oxide.

It is believed that the cesium tungsten oxide dispersions in examples 5-7 disclosed herein would, when incorporated into an example of the jettable composition disclosed herein, behave in the same manner or in a substantially similar manner as they did in these examples.

It is to be understood that the ranges provided herein include the stated range and any value or sub-range within the stated range. For example, a range from about 2 wt % to about 35 wt % should be interpreted to include not only the explicitly recited limits of from about 2 wt % to about 35 wt %, but also to include individual values, such as 3.35 wt %, 5.5 wt %, 17.75 wt %, 28.85 wt %, etc., and sub-ranges, such as from about 3.35 wt % to about 16.5 wt %, from about 2.5 wt % to about 27.7 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A dispersion, comprising:
   cesium tungsten oxide nanoparticles;
   a zwitterionic stabilizer, wherein the zwitterionic stabilizer comprises C2 to C8 betaine in an amount ranging from 8 wt % to 35 wt % of a total wt % of the dispersion or C2 to C8 aminocarboxylic acid in an amount ranging from 2 wt % to 20 wt % of a total wt % of the dispersion; and
   a balance of water.

2. The dispersion as defined in claim 1, wherein a weight ratio of the cesium tungsten oxide nanoparticles to the zwitterionic stabilizer ranges from 1:10 to 10:1.

3. The dispersion as defined in claim 1, wherein the C2 to C8 aminocarboxylic acid has a solubility of at least 10 g in 100 g of water.

4. The dispersion as defined in claim 1, wherein:
   the C2 to C8 aminocarboxylic acid is selected from the group consisting of: beta-alanine, gamma-aminobutyric acid, glycine, and combinations thereof.

5. A jettable composition, comprising:
   cesium tungsten oxide nanoparticles, wherein the cesium tungsten oxide nanoparticles have an average particle diameter of 1 nanometer (nm) to 15 nm;
   a zwitterionic stabilizer;
   a surfactant; and
   a balance of water.

6. The jettable composition as defined in claim 5, wherein a weight ratio of the cesium tungsten oxide nanoparticles to the zwitterionic stabilizer ranges from 1:10 to 10:1.

7. The jettable composition as defined in claim 5, wherein the zwitterionic stabilizer is selected from the group consisting of a C2 to C8 betaine, a C2 to C8 aminocarboxylic acid having a solubility of at least 10 g in 100 g of water, taurine, and combinations thereof.

8. The jettable composition defined in claim 7, wherein:
   the zwitterionic stabilizer is the C2 to C8 betaine; and
   the C2 to C8 betaine is present in an amount ranging from about 8 wt % to about 35 wt % of a total wt % of the jettable composition.

9. The jettable composition as defined in claim 7, wherein:
   the zwitterionic stabilizer is the C2 to C8 aminocarboxylic acid;
   the C2 to C8 aminocarboxylic acid is selected from the group consisting of beta-alanine, gamma-aminobutyric acid, glycine, and combinations thereof; and
   the C2 to C8 aminocarboxylic acid is present in an amount ranging from about 2 wt % to about 20 wt % of a total wt % of the jettable composition.

10. The jettable composition as defined in claim 5, wherein:
    the cesium tungsten oxide nanoparticles are present in the jettable composition in an amount ranging from about 1 wt % to about 15 wt %;
    the zwitterionic stabilizer is present in the jettable composition in an amount ranging from about 2 wt % to about 35 wt %;
    the surfactant is present in the jettable composition in an amount ranging from about 0.1 wt % to about 4 wt %; and
    the jettable composition further includes a co-solvent present in an amount ranging from about 2 wt % to about 80 wt %.

11. The jettable composition as defined in claim 5, further comprising an additive selected from the group consisting of an anti-kogation agent, a chelating agent, an antimicrobial agent, and combinations thereof; wherein the additive is present in the jettable composition in an amount ranging from about 0.01 wt % to about 20 wt % based on a total wt % of the jettable composition.

12. The jettable composition as defined in claim 5, further comprising a colorant present in an amount ranging from about 1 wt % to about 10 wt % based on a total wt % of the jettable composition.

13. A method for improving the stabilization of a jettable composition, the method comprising:
    incorporating a zwitterionic stabilizer in the jettable composition, including:
      cesium tungsten oxide nanoparticles, wherein the cesium tungsten oxide nanoparticles have an average particle diameter of 1 nanometer (nm) to 15 nm;
      a surfactant;
      a co-solvent; and
      a balance of water; and
    jetting the jettable composition via thermal inkjet printhead.

14. The method as defined in claim 13, further comprising:
    incorporating the zwitterionic stabilizer into an aqueous dispersion containing the cesium tungsten oxide nanoparticles, thereby forming a stabilized dispersion; and
    combining the surfactant, the co-solvent, and the balance of water with the stabilized dispersion.

* * * * *